United States Patent
Keppel et al.

(10) Patent No.: US 12,242,753 B2
(45) Date of Patent: Mar. 4, 2025

(54) REDUCED NETWORK LOAD WITH COMBINED PUT OR GET AND RECEIVER-MANAGED OFFSET

(71) Applicant: Intel Corporation, Santa Clara, CA (US)

(72) Inventors: David Keppel, Mountain View, CA (US); David M. Ozog, Ashland, MA (US)

(73) Assignee: Intel Corporation, Santa Clara, CA (US)

( * ) Notice: Subject to any disclaimer, the term of this patent is extended or adjusted under 35 U.S.C. 154(b) by 650 days.

(21) Appl. No.: 17/485,114

(22) Filed: Sep. 24, 2021

(65) Prior Publication Data
US 2022/0011966 A1    Jan. 13, 2022

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
CPC ....... G06F 3/0655; G06F 3/0604; G06F 3/067
USPC ........................................................ 711/154
See application file for complete search history.

(56) References Cited

U.S. PATENT DOCUMENTS

| | | | |
|---|---|---|---|
| 10,033,837 B1* | 7/2018 | Amdahl | H03M 7/3088 |
| 2013/0110908 A1* | 5/2013 | Bahlke | G06F 11/3006 709/203 |
| 2015/0207724 A1* | 7/2015 | Choudhury | H04L 45/42 370/255 |
| 2016/0314073 A1* | 10/2016 | Dinan | G06F 3/067 |

OTHER PUBLICATIONS

Dinan, James and Flajslik, Mario; "One-Sided Append: A New Communication Paradigm for PGAS Models," Intel Corporation, Sep. 30, 2014, 5 pages.

Md. Wasi-ur-Rahman, et al, "Lightweight Instrumentation and Analysis using OpenSHMEM Performance Counters," OpenSHMEM Workshop 2018, Intel Corporation, Aug. 24, 2018, 40 pages.

* cited by examiner

*Primary Examiner* — Than Nguyen
(74) *Attorney, Agent, or Firm* — Compass IP Law PC

(57) ABSTRACT

Methods and apparatus for reduced network load with receiver-managed offset (RMO) PUT or GET messages. An RMO PUT message including an RMO key, data, and a length is sent from an initiator to a target, where the RMO key is extracted by a Network Interface controller (NIC), SmartNIC, or Infrastructure Processing Unit and used to identify an address or address offset of a memory buffer in a target memory at which to write the data. An RMO GET message is sent from an initiator to a target and includes an RMO key, a source buffer on the target, and a length. The target processes the RMO GET, reads the length of data from its source buffer, and returns a message to the initiator including the RMO key, the read data, and the length. The RMO key is extracted and used to identify an address or address offset of a memory buffer in a memory on the initiator in which to write the read data.

20 Claims, 11 Drawing Sheets independent remote integrated

REDUCED NETWORK LOAD WITH COMBINED PUT OR GET AND RECEIVER-MANAGED OFFSET

BACKGROUND INFORMATION

Messaging systems are often described as "two-sided" or "one-sided". Two-sided messaging uses a rendezvous or other handoff between sender and receiver. In turn, the first task to arrive is often delayed due to the rendezvous.

One-sided network messaging with remote memory access or "RMA" can be efficient because it avoids the rendezvous needed for send( )/receive( ) messaging. However, the burden is on the RMA sender to determine where to put or get the data. A class of applications solve this problem by sending message pairs: a first message asks the target where to put/get the data, and then a second message does the data transfer. Unfortunately, this doubles the number of messages; and the second data transfer message is blocked/delayed by the full round-trip time of the first "where" message. Further, the "where" message is typically a small message, and small messages can have an order of magnitude worse messaging efficiency—while the message payload is small, the overall cost is much larger than the payload size suggests.

In pseudocode, this approach looks like:

```
1.   data, len, receiver = work(i, ...)
2.   where = message_atomic_fetch_add(&frontier, len, receiver)
3.   message_put(dst=where, src=data, len, receiver)
```

Here, &frontier identifies a receiver-side counter which is incremented by len (length) in order to reserve space in a receiver-side buffer. The following put( ) then writes message bytes to the reserved space.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
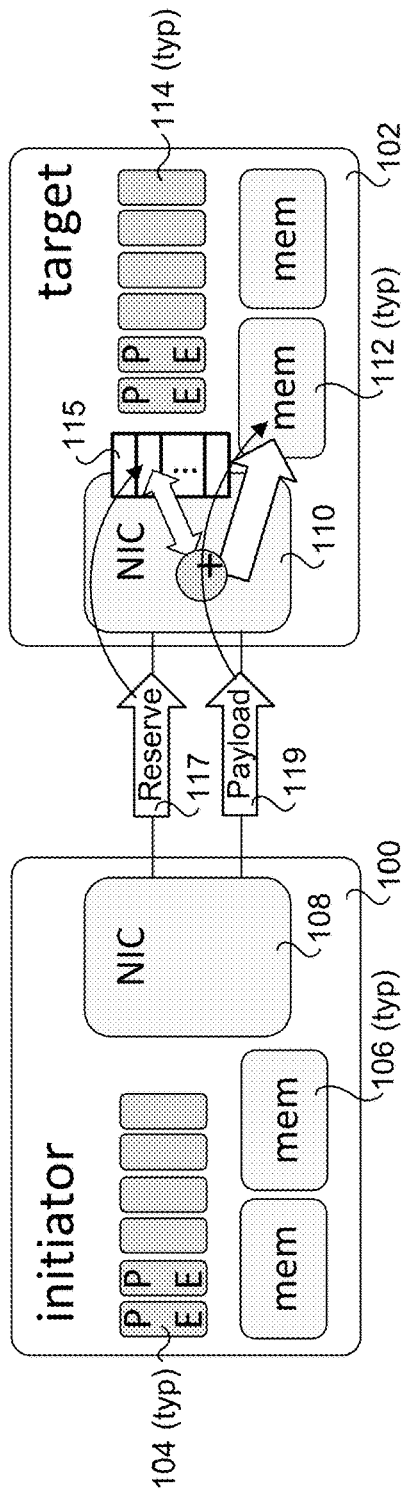
FIG. 1 is a schematic diagram illustrating an example of a two message RMO PUT.

Embodiments of methods and apparatus for reduced network load with combined PUT or GET and receiver-managed offset are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Under a receiver-managed offset (RMO), the receiver keeps state indicating where to access memory (e.g., where to write for a PUT and where to read for a GET). Under a two-message RMO PUT, a sender sends a first message to allocate or "reserve" space on the receiver, then a second message to send data bytes into that reservation. In pseudocode this looks like:

```
1    // setup
2    frontier = ...
3    barrier( )
4    // inner loop
5    for i in 1..N:
6       data, len, receiver = work(i, ...)
7       where = message_atomic_fetch_add(&frontier, len,
               receiver)
8       message_put(dst=where, src=data, len, receiver)
```

In the foregoing pseudocode, dst is the destination address, src is the source address of the data, and len is the length of the data (e.g., in bytes).

A limitation of this approach is that two messages are needed: one for the sender to request a receiver-side fetch-add to reserve space, then a second message to send the payload bytes. This has several down-sides. First, two messages are needed to send one payload. Ideally, just one message per payload should be needed. Second, small messages tend to be less efficient than large messages, and the fetch-add messages are small messages. Third, the message_put( ) cannot be started until where is known. In turn, the sender is idle waiting for the fetch-add result—thus the fetch-add blocks both the send( ) and also further work( ).

A model of RMO employing two messages is shown in FIG. 1. The participants are an initiator 100 that initiates the data transfer and a target 102 that is where the data is targeted to be transferred. Generally, each of initiator 100 and 102 may be referred to as nodes, which may comprise physical entities or virtual entities. Under the embodiments illustrated herein, the nodes comprise physical entities such as compute platforms (aka compute nodes).

Initiator 100 includes multiple processing elements (PEs) 104, multiple memories 106 (or otherwise memory partitioned into multiple memory regions), and a network interface controller (NIC) 108, which is representative of various types of network interfaces, network adaptors, host controller adaptors (for InfiniBand), etc. Target 102 has a similar configuration including a NIC 110, multiple memories 112, and multiple processing elements 114. Target 102 further is depicted as including indicators 115, which are used to determine where (e.g., at which starting address or block) the data are to be PUT (written to or merged) or GET (read from) on target 102.

Under a two-message RMO PUT, initiator 100 sends a first reserve "message" 117 to target 102, which is used to reserve space in a memory buffer in memory 112 on target 102. This results in an update in a data structure 115, such as a list or circular buffer of indicators. Subsequently, initiator 100 sends a payload message 119 to target 102 containing the data that are to be written to the reserved space in the memory buffer. Upon receipt of payload message 119, target 102 looks up the indicator in data structure 115 to determine where in memory to "update.". For an RMO PUT, an update is often "write message bytes to memory"; however, the update could be a merge. Under one RMO scheme, the indicators in data structure 115 comprise addresses. Alternatively, the indicators may comprise counters.

Indicators can generally be multiple indicators per target resource—e.g., multiple per PE. Resources can be logical—e.g., per virtual address space. There may also be separate indicator groups per resource, e.g., distinct indicators for distinct PEs.

Under the pseudocode presented above, '&frontier' is a memory address. An operation that increments a value according to '&frontier' needs to locate the value, typically using an associative address match to find the value in a cache." This results in an address match overhead.

In accordance with an aspect of the embodiments herein, a design is provided where a counter is managed in terms of a general "key." For example, in one embodiment the key is a small integer. A small integer can be used to directly index a table, saving address match overhead. At the same time, the index is small and so can be conveyed in a message more efficiently than a full address—e.g., one byte instead of four to eight bytes typically needed for a full address. This can improve messaging efficiency.

Figure 2:
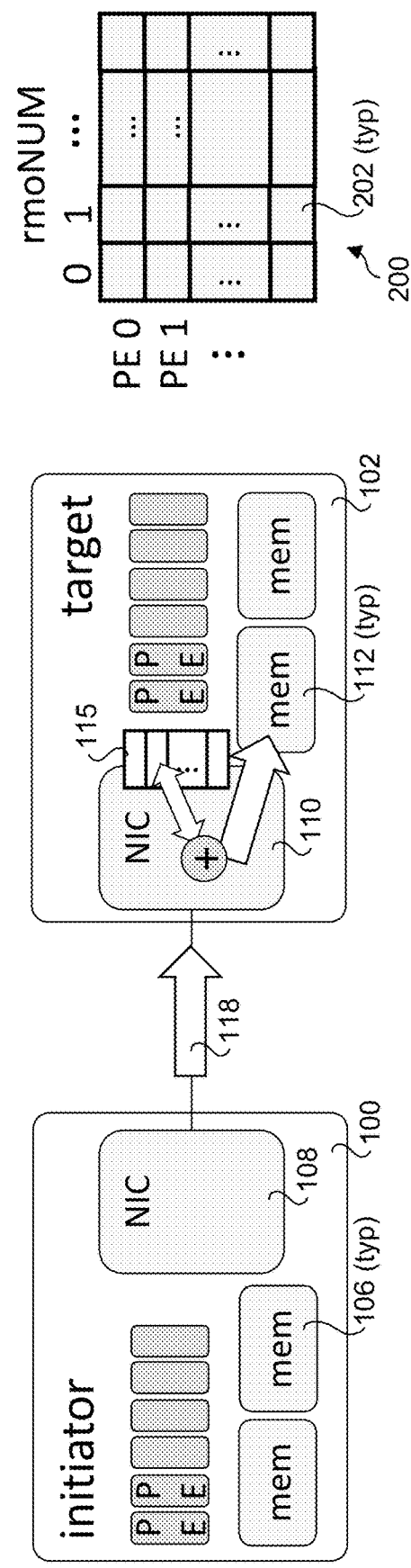
FIG. 2 is a schematic diagram illustrating an example of a single message RMO PUT.

FIG. 2 depicts an example of a single message RMO PUT. Under this approach, initiator 100 sends a message 118 comprising a collection of values to target 102. Upon receipt of message 118, target 102 looks up the current indicator in a data structure 115 used to store indicators (e.g., a table or a circular FIFO (first-in first-out)) to determine where in memory to update. Following the memory update, the indicator is updated if needed (e.g., incremented to next entry in the list) so the following messages can write to different locations. If necessary (current buffer is full or would overflow if written to), the indicator update may identify a new buffer into which the data are to be written. The RMO operations may also generate values (e.g., interrupt, flag, etc.) to inform PEs 114 that a message is updated memory on target 102.

FIG. 2 further shows an exemplary data structure comprising a table 200 in which indicators are stored. Under this example, each PE is allocated a respective row in table 200. Each cell 202 in table 200 is a memory address or offset, or other indicia that may be used to determine the starting address at where to access the memory on the target. For example, a block offset might be used, where it is known in advance that data are transferred in blocks or chunks having a fixed size.

An indicator table may also be indexed by small numbers (e.g., PE #and per-PE RMO #). Using an indexed table allows fast look-up vs. match-based look-up.

Figure 3:
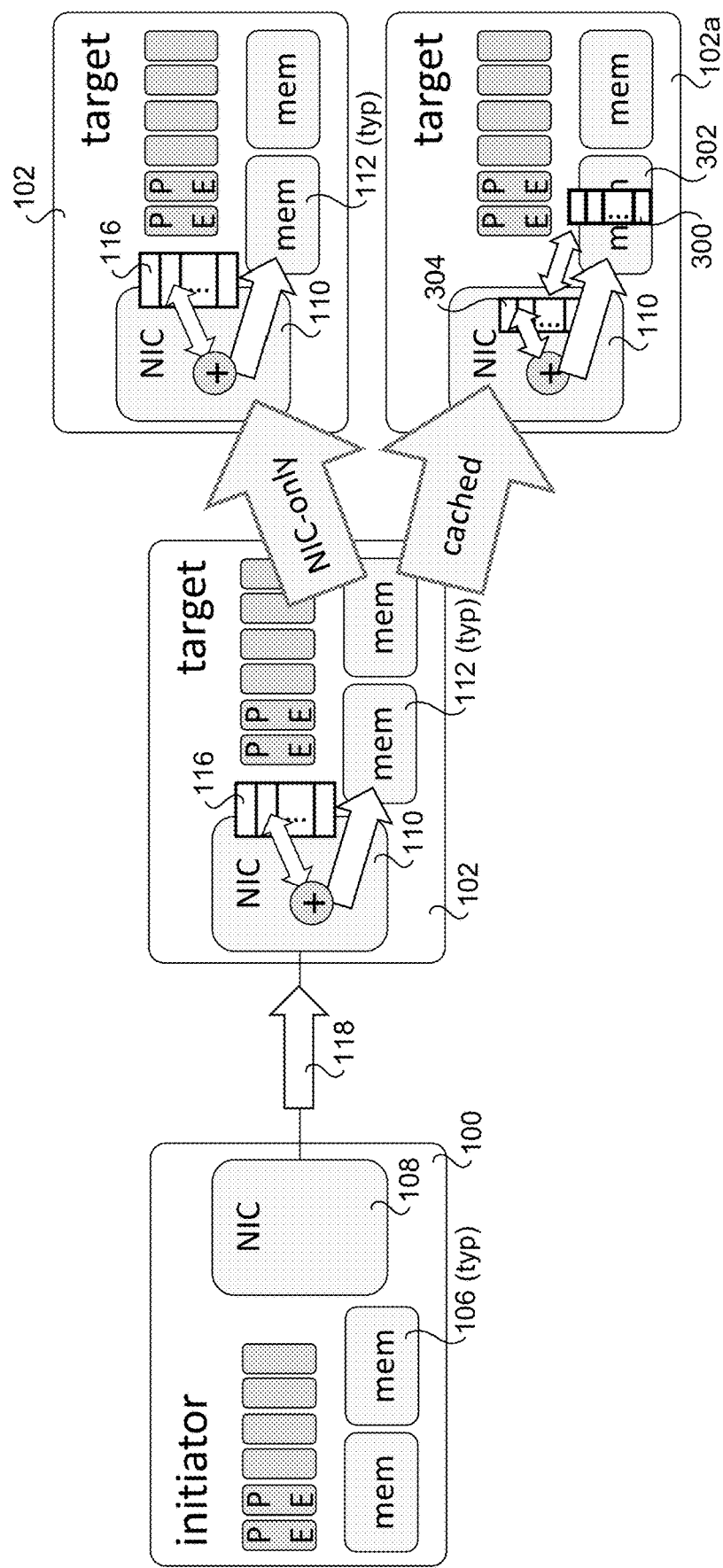
FIG. 3 is a schematic diagram of a single message RMO PUT illustrating alternative placements using an on-NIC list of indicators and a cached list of indicators.

FIG. 3 shows examples of indicator table placement. In some instance, an indicator table may be entirely in the NIC, such as shown under the NIC-only target 102 (similar to shown in FIGS. 1 and 2 above). The NIC may also cache parts of an indicator table from memory, as shown for a cached target 102a. In this example, an indicator table 300 is stored in memory 302, while an indicator table cache 304 is implemented on NIC 110.

Figure 4:
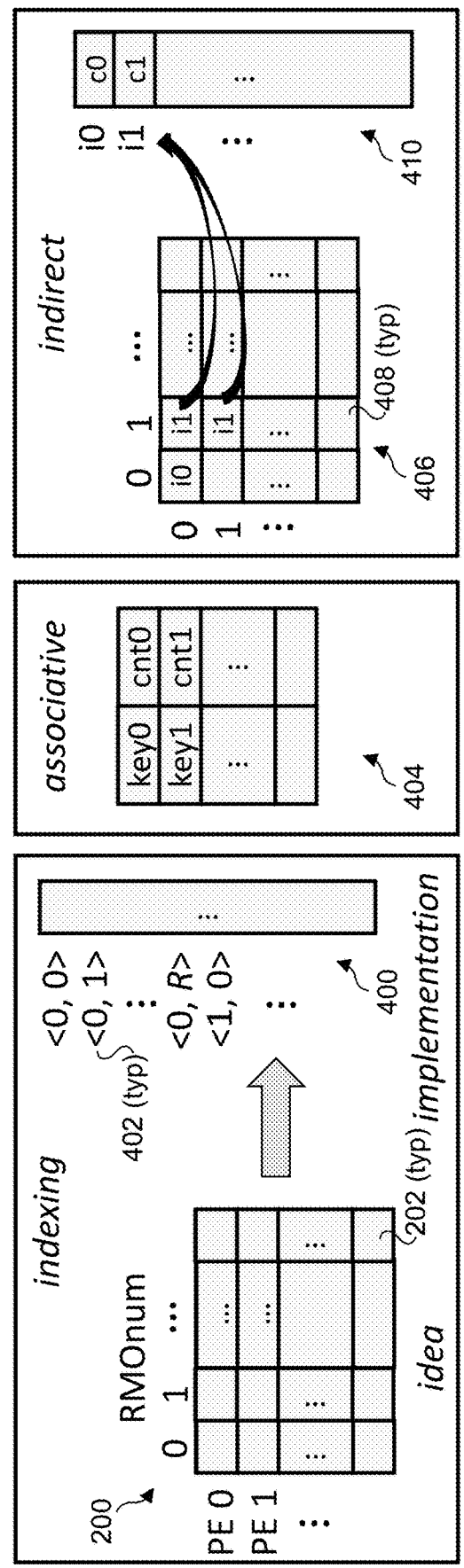
FIG. 4 is a diagram illustrating examples of using indexing, associative, and indirect implementations for locating indicators.

FIG. 4 shows examples of using indexing, associative, and indirect implementations for locating indicators. Under the indexing implementation, and N-dimensional array (N=2 in this example) is mapped on a 1-D array 400. The 1-D array entries comprise order pair 402, where the first value identifies the PE and the second value identifies the RMOnum. In one embodiment, the index is a bitwise concatenation of fields; thus the index can be done in a single cycle. However, this is merely exemplary, as other indexing schemes may be used.

With many counters or when using dynamic counter assignment, it may be desirable to do an associative lookup. Under the associative scheme, a table or list 404 comprise key-value pairs is used, with the first column containing the keys and the second column containing the counter values. The key itself may be a concatenation of PEnum, RMOnum, e.g., "key"=<PEnum, RMOnum, . . . > or "key"=<RMOnum, PEnum, . . . >, which may be much smaller than a general address. This approach is often faster than full VADDR (virtual address) associative lookup.

In some implementations, it may be desirable to have several different <a, b, c> values map to a single shared counter. This is illustrated in the indirect mapping. An indirect table 406 includes cells 408 containing index values (i0, i1, etc.) that are used to map to a second 1-D table 410 containing counter values that is indexed by its row number. The index value in indirect table 406 is used to locate the counter value in table 410. This may be used with either an array-index (as shown) or associative approaches.

This approach is illustrated in the following pseudocode, which includes an integer rmo value that is used as an rmo_key:

```
1    int rmo = rmo_initialize(&frontier, ...)
2    for i in 1..N:
3        data, len, PE_tag = work(i, ...)
4        message_put_rmo(rmo_key=rmo, src=data, len, PE_tag)
```

In this and the following pseudocode examples, PE_tag is used to identify the PE associated with the data buffer in which data are to be written, merged, or read. Under some implementations, PE_tag includes a node ID+a PE ID, such as a PE number. Under other implementations, PE_tag is a PE ID (e.g., PE number).

If work( ) can return different data buffers on each iteration, then a non-blocking variant put_rmo_nb( ) can be used so computation and communication can be fully overlapped. In pseudocode:

```
1    int rmo = rmo_initialize(&frontier, ...)
2    for i in 1..N:
3        data, len, PE_tag = work(i, ...)
4        message_put_rmo_nb(rmo_key=rmo, src=data, len, PE_tag)
5        drain( ) // complete all in-flight messages
```

A push( ) message operation may be used to send data from an initiator to a target. Another common single-sided message operation is get( ) which reads data from the target and returns the data to the initiator. In one embodiment, push( ) and get( ) are extended to support a fetching operation get_rmo( ) that moves data from target to initiator. In pseudocode:

```
1    int rmo = rmo_initialize(&frontier, ...)
2    for i in 1..N:
3        buffer, len, PE_tag = work0(i, ...)
4        message_get_rmo(dst=buffer, src_key=rmo, len, PE_tag)
5        work1(i, buffer, len)
```

The message_get_rmo message passes a destination buffer along with a src_key comprising the integer rmo value. If separate buffers are provided, a non-blocking operation is supported. In pseudocode:

```
1 int rmo = rmo_initialize(&frontier, ...)
2 for i in 1..N:
3 buffer[i], len, PE_tag = work0(i, ...)
4 message_get_rmo_nb(dst=buffer[i], src_key=rmo, len,
    PE_tag)
5 drain( ) // complete all in-flight messages; ensure buffer[ ] data is ready
6 for i in 1..N:
7 work1(i, buffer[i], len)
```

Figure 5:
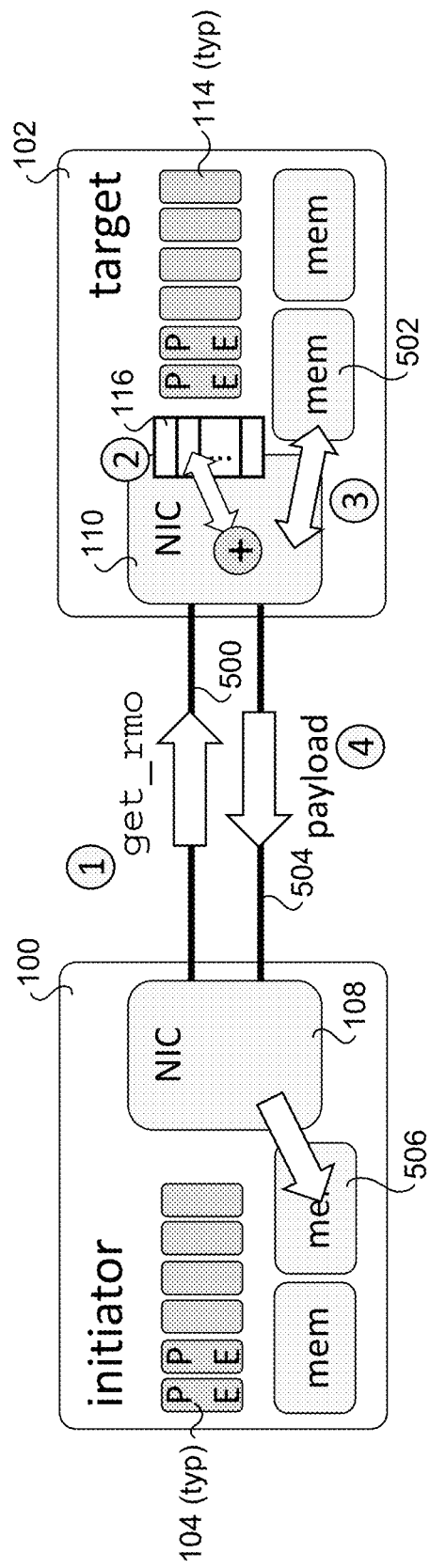
FIG. 5 is a schematic diagram illustrating a first example of a get_rmo( ) process employing indicators implemented by the target's NIC, according to one embodiment.

As schematic example of the get_rmo( ) process is shown in FIG. 5, which depicts an initiator 100 and a target 102 having a similar configuration to that shown in the foregoing figures. As depicted by a first operation '1', initiator 102 submits get RMO operation via a message_get_rmo message 500 with a desired destination buffer, RMO key, buffer length, and target PE. During the second operation '2' an RMO lookup of initiator table 116 occurs at target 102 given the initiator's key. As depicted by a third operation '3', target 102 locates and transfers the appropriate source buffer in memory 502 to NIC 110. NIC 110 then sends a message containing the payload 504 that is delivered to the initiator destination buffer in memory 506, as depicted by a fourth operation '4'.

Figure 6:
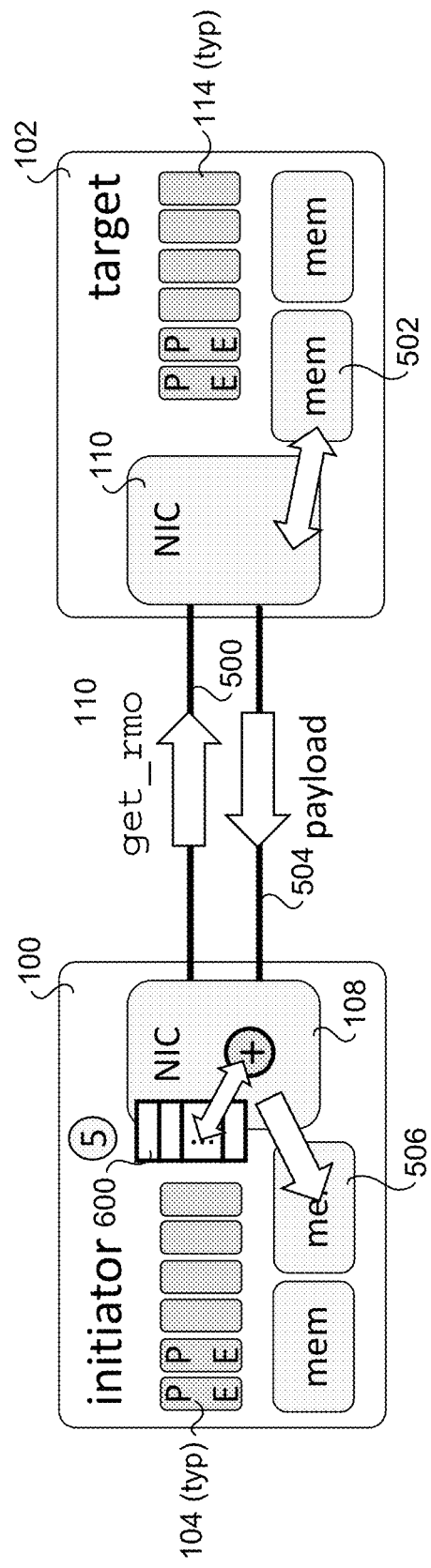
FIG. 6 is a schematic diagram illustrating a second example of a get_rmo( ) process employing indicators implemented by the initiator's NIC, according to one embodiment.

FIG. 6 shows a variant of a get_rmo( ) process that is used for payload delivery at the initiator. Optionally, the approaches in FIGS. 5 and 6 may be combined. As depicted by like reference numbers in FIGS. 5 and 6 the operations are similar up to payload 504 being delivered to NIC 108 of initiator 100. In this case, NIC 108 uses the initiator's RMO key to lookup the corresponding initiator and locate the appropriate destination buffer in memory 506, as depicted by the fifth operation '5'.

Another message that may employ the techniques disclosed herein is an UPDATE message. The UPDATE message takes the message bytes and merges them with memory contents (updates memory) under some operation OP. For example, given LEN words and I in [0 . . . LEN), then DST[I]=OP(PAYLOAD[I], DST[I]). Where OP may be ADD, MUL, MIN, MAX, etc. In one respect, a PUT is effectively an UPDATE message where OP is just DST[I]=PAYLOAD[I]–writes DST[I] without reading it. For PUT and GET, the write to memory can generally be an UPDATE rather than a simple write; the RMO operation described here applies to both memory writes and UPDATE.

In recent years, OpenSHMEM has been extended to support two new programming constructs: teams and contexts. A "team" is a collaborating subset of tasks that can span the network. A "context" is an abstraction of a communication channel that can be named explicitly by a program in order to optimize the management of network resources. Other messaging systems have similar concepts, such as MPI communicators and Portals constructs.

In accordance with another aspect of some embodiments, an RMO interface that operates using teams and contexts is provided. Specifically, a team and context are created and associated in the usual way, then associated with the RMO by passing the team identifier to the RMO initialization and extending the message_put_rmo( ) call to take the associated context. In pseudocode:

```
1   shmem_team_t rmo_team = ... // prior art
2   shmem_ctx_t rmo_ctx // prior art
3   shmem_team_create_ctx(rmo_team, ...options..., &rmo_ctx) // prior art
4   rmo = rmo_initialize(rmo_team, &frontier, ...) // disclosed
5   for i = 1..N:
6   data, len, PE_tag = work(i, ...)
7   // disclosed:
8   message_put_rmo(rmo_ctx, rmo_key=rmo, src=data, len,
        PE_tag)
```

RMO objects can be associated with PE-groups, or teams. For example, teams/RMOs may be bound to certain processors and/or have affinity to separate/dedicated memory spaces.

Figure 7:
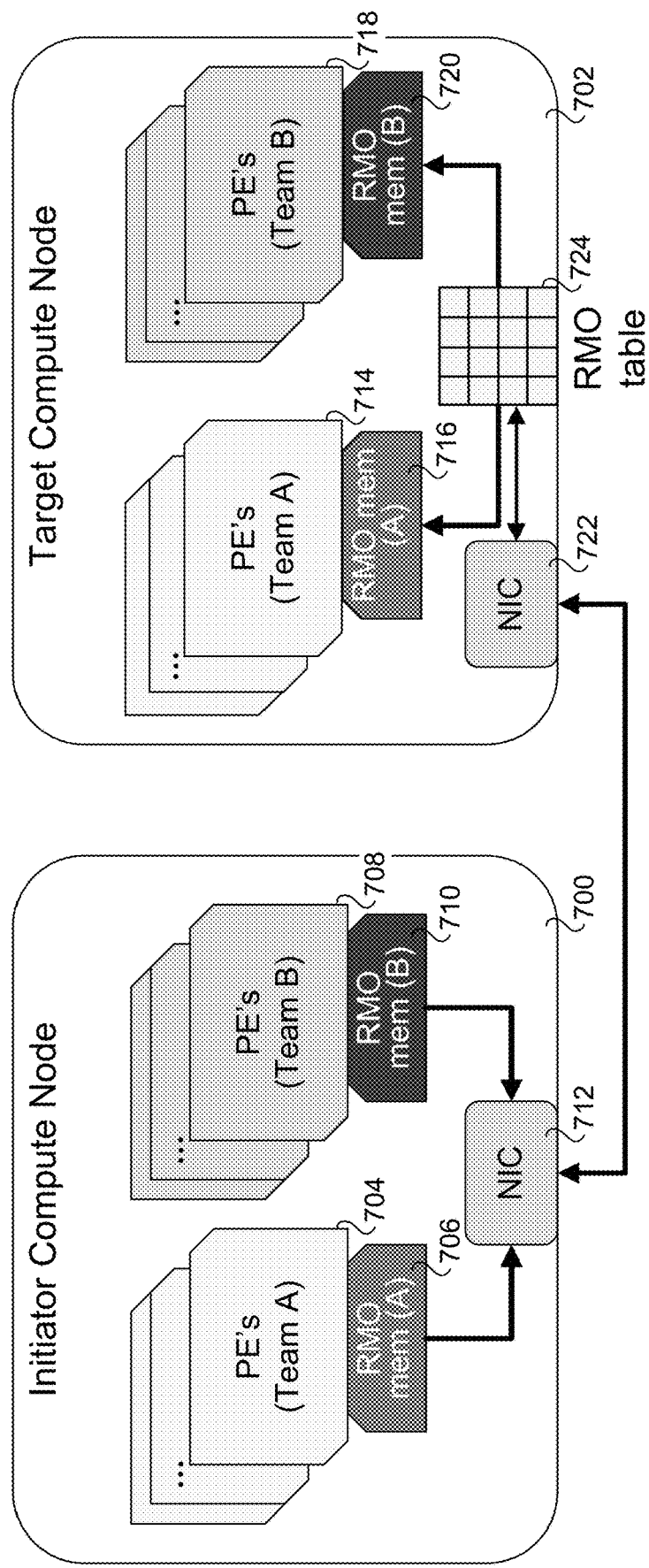
FIG. 7 is a schematic diagram illustrating an example of a multi-PE/Teams-based RMO, according to one embodiment.

An example of a multi-PE/Teams-based RMO is shown in FIG. 7, which depicts transfers between an initiator compute node 700 and a target compute node 702. Initiator compute node 700 includes a Team 'A' of PE's 704 configured to access RMO memory (A) 706 and a Team 'B' of PE's 708 configured to access RMO memory (B) 710. RMO memory (A) 706 and RMO memory (B) 710 are coupled to a NIC 712.

Target compute node 702 includes a Team 'A' of PE's 714 configured to access RMO memory (A) 716 and a Team 'B' of PE's 718 configured to access RMO memory (B) 720. Target compute node 702 also includes a NIC 722 and an RMO table 724.

At target node 702, RMO table 724 contains the rmo-key mappings to the applicable buffers in RMO memory (A) 716 and RMO memory (B) 720.

Figure 8A:
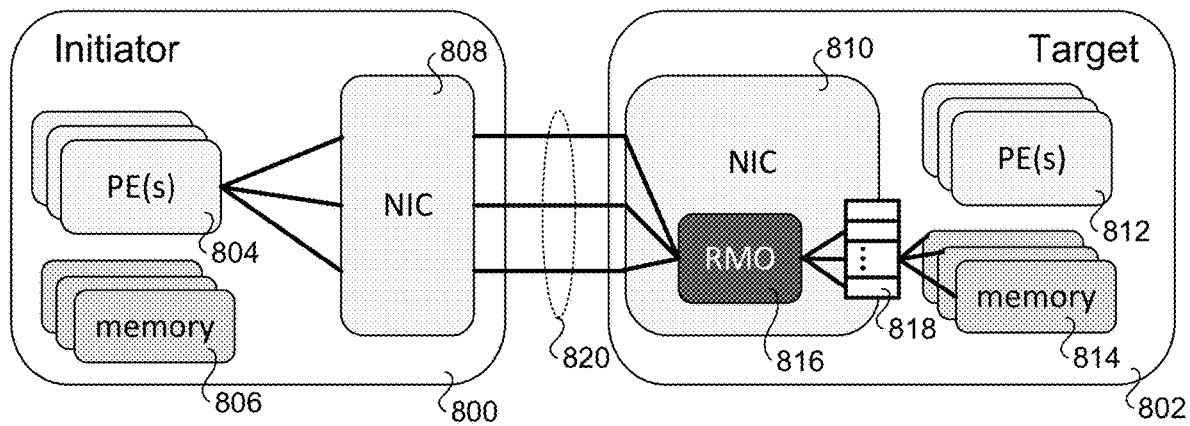
FIG. 8a is a diagram illustrating a first example of an RMO and associated communication channels under which one logical RMO "gadget" is shared across logical channels.
Figure 8B:
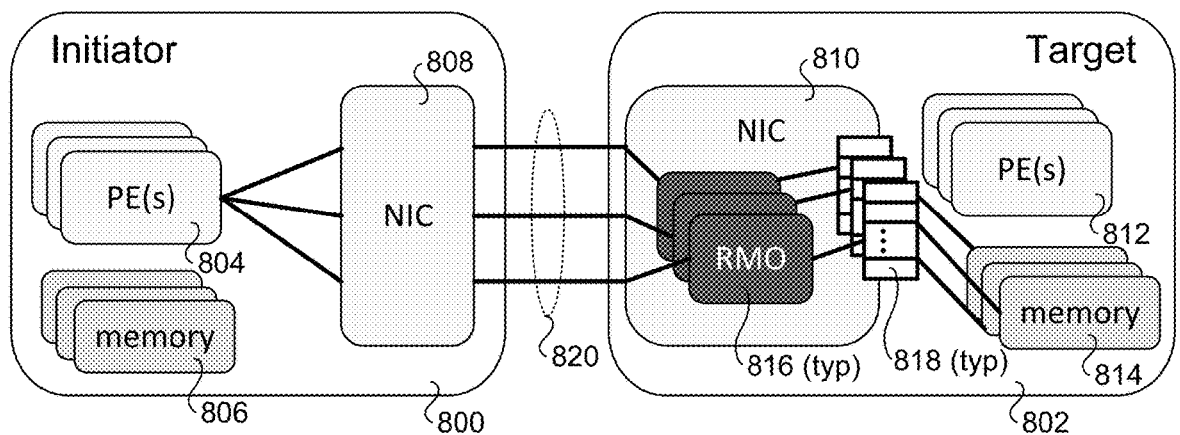
FIG. 8b is a diagram illustrating a second example of an RMO and associated communication channels which employs one logical RMO gadget per logical channel.

FIGS. 8a and 8b illustrate examples of RMOs and associated communication channels. In FIG. 8a, one logical RMO "gadget" is shared across logical channels. Initiator 800 is coupled to target 802 via multiple logical channels 820. Initiator 800 includes a plurality of PEs 804 enabled to access memory 806 and coupled to NIC 808. Target 802 includes a NIC 810, a plurality of PEs 812 enabled to access memory 814. NIC 810 includes an RMO gadget 816 and an RMO table 818.

Under the embodiment in FIG. 8b there is one logical RMO gadget 816 per logical channel 820. Alternate embodiments may implement multiple RMO tables 818 (as shown), or may implement a multi-dimension table/data structure. Such RMO tables and data structures may also be sparse.

Applications to Nodes

The techniques disclosed herein provide advantages for large-scale networks, and also for small-scale "in-node networks" (INNs) used to connect tens, hundreds, or thousands, etc., of microprocessors in a socket or on a single board. Historically, compute nodes employ a cache-coherent domain. However, with increasing core/XPU counts, cache coherency cost grows. For example, coherency support physical structure size/cost can grow. Message delivery may require more hops, which results in more cost for coherency protocol "extra" messages. Additionally physical scaling may require multiple dies linked together, but link bandwidth/latency may between dies may be worse than in-die.

The foregoing issues may be addressed using modified protocols that employ more efficient communication patterns. These modified protocols avoid using space in physical structures and employ protocols with fewer hops. On such modified protocol is MOVPUT (U.S. Pat. No. 10,606, 755), which supports core-to-core data transfers. MOVPUT can be started by an initiator as soon as data is ready, and which thus allows the target to read the data directly from its own cache and without incurring delays.

As INNs grow to connect hundreds of cores, the "fetch on demand" behavior of cache protocols, such as MESI (modified/exclusive/shared/invalid) and similar protocols for example, scale poorly for some workloads, hence the motivation for MOVPUT. However, using MOVPUT effectively for a wider range of workloads can reintroduce the fetch-add/send( ) pattern, where send( ) is implemented using MOVPUT, but the fetch-add causes the atomic operation's cache line to "bounce" from core to core.

Figure 9:
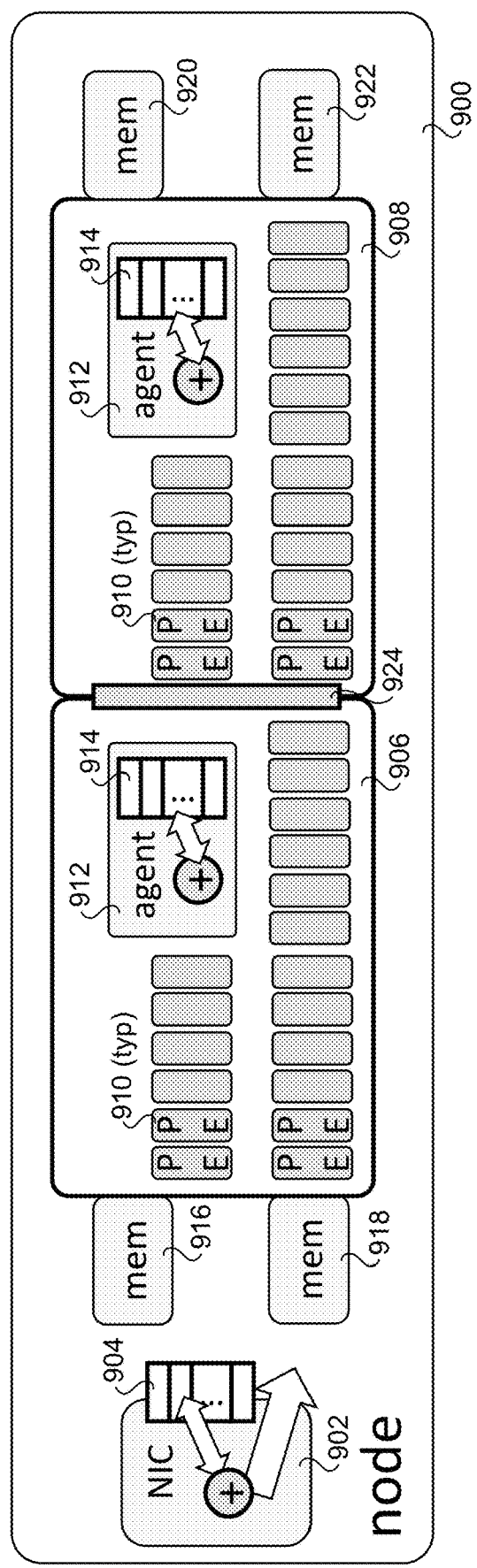
FIG. 9 is a schematic diagram illustrating an implementation of in-node RMO, according to one embodiment.

FIG. 9 shows a node 902 in which in-node RMO is implemented, according to one embodiment. Node 900 includes a NIC 902 that accesses an RMO table 904. Node 900 includes two CPUs or Other Processing Units (collectively termed XPUs) 906 and 908. XPUs may include but are not limited to one or more of Graphic Processor Units (GPUs) or General Purpose GPUs (GP-GPUs), a Tensor Processing Unit (TPU), Data Processor Units (DPUs), Infrastructure Processing Units (IPUs), Artificial Intelligence (AI) processors or AI inference units and/or other accelerators, FPGAs and/or other programmable logic (used for compute purposes), etc. While some of the diagrams herein show the use of CPUs, this is merely exemplary and non-limiting. Generally, any type of XPU may be used in place of a CPU in the illustrated embodiments. Moreover, as used in the following claims, the terms "processor," "processor unit," and "processing units" are used to generically cover CPUs and various forms of XPUs.

Each of CPUs/XPUs 906 and 908 have a similar structure including multiple PEs 910, an agent 912 and an RMO table 914. CPU/XPU 906 is coupled to memory 916 and 918, while CPU/XPU 908 is coupled to memory 920 and 922. CPU/XPU 906 and 908 are communicatively coupled via an interconnect 924, where interconnect 924 may be a physical interconnect or may be logical. When a CPU or XPU is implemented as a "socket," interconnect 924 may comprise a socket-to-socket interconnect. When both CPU/XPU 906 and 908 are implemented in separate dies on the same substrate, interconnect 924 may comprise an inter-die interconnect.

In addition to the architecture shown for node 900, a node may employ an array of processing elements, such as but not limited to an array of cores or an array of core "tiles." Under various configurations, agents may be associated with individual cores, groups of cores, and/or groups of core tiles.

For node 900, NIC 902 uses RMO table 904 when the node is acting as a target for a given data transaction. Node 900 may also operator as an initiator. For data transactions between CPU/XPU 906 and 908, an agent 912 employs it associated RMO table 914 in a similar manner to the NICs in the embodiments discussed above. In one embodiment, an agent 912 and RMO table 914 are implemented in an interface for interconnect 924.

Using the disclosed approach, the fetch-add and MOVPUT may be bundled, so that the MOVPUT payload is sent to the scalable atomics unit and then forwarded directly to the target cache. This is called AMOPUT (Atomic Memory Operation—PUT). In some embodiments, a socket will be built as a multi-chip module with several compute dies and at least one scalable atomics unit per die, with the target cache and scalable atomics unit being co-located on the same die. In turn, AMOPUT reduces the number of die or other communication domain crossings. Further, in multi-chip modules, the message cost between dies is much higher than the message cost within dies, so AMOPUT message reduction can have a benefit larger than simply the raw reduction in message count, by reducing the number of expensive/cross-die and/or cross-domain messages.

A node may include a "scalable atomics" unit for high-performance arithmetic on values shared among cores/PEs. An RMO agent may also be implemented using scalable atomics. Examples of scalable atomics units employing RMO agents are shown in FIGS. 10a, 10b, and 10c.

Figure 10A:
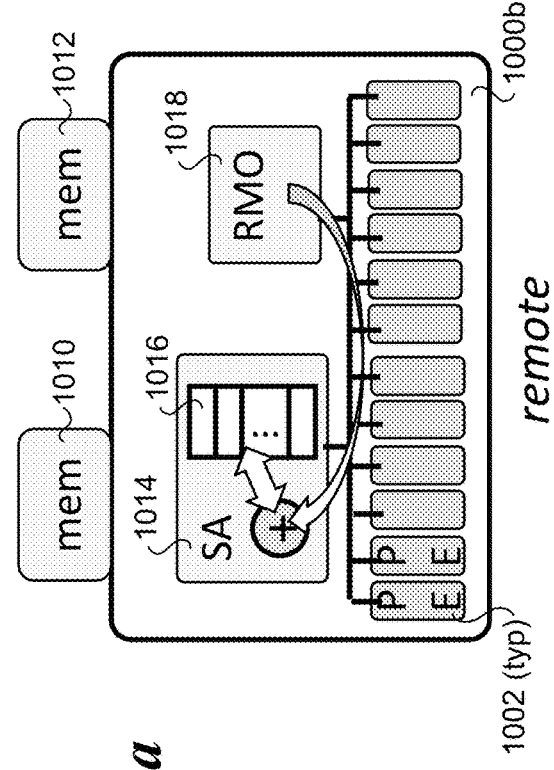
FIG. 10a is a schematic diagram illustrating a node in which a scalable atomic unit and an RMO agent are implemented independently.

Under the independent embodiment of FIG. 10a, a node 1000a includes multiple PEs 1002 coupled to a scalable atomics (SA) unit 1004 and an RMO agent 1006 with an RMO table 1008, and memory 1010 and 1012. In this embodiment, SA unit 1004 and RMO agent 1006 operate independently.

Figure 10B:
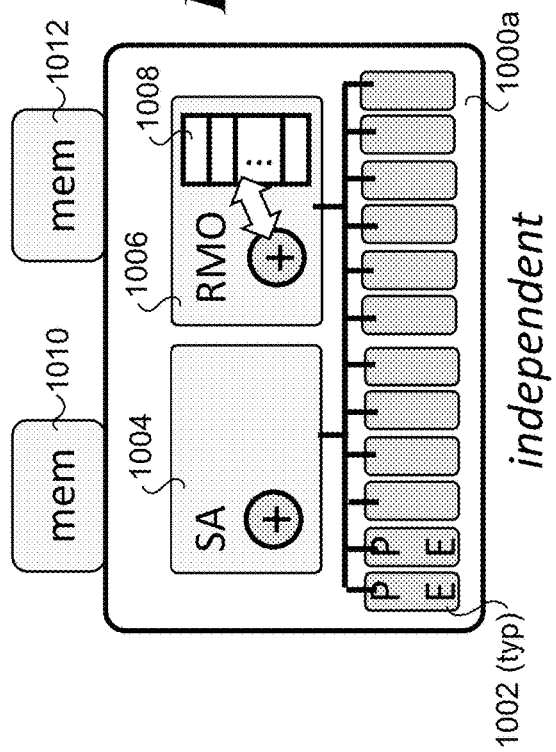
FIG. 10b is a schematic diagram illustrating a node in which an RMO agent interacts with a scalable atomic unit using a remote access scheme.

Under the remote embodiment of FIG. 10b, a node 1000b includes a scalable atomics unit 1014 with a traffic table 1016, and an RMO agent 1018. This embodiment re-uses an existing scalable atomics unit but adds traffic between SA and RMO agents in traffic table 1016 that can interfere with other traffic.

Figure 10C:
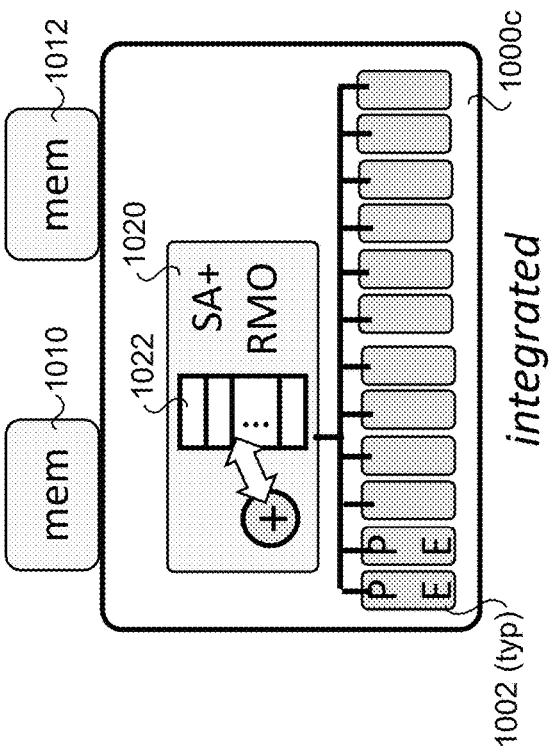
FIG. 10c is a schematic diagram illustrating a node employing an integrated scalable atomic unit with an RMO agent.

Under the integrated embodiment of FIG. 10c, a node 1000c includes an integrated scalable atomics unit with RMO agent 1020 and an RMO table 1022. This embodiment can further reduce overhead both through integration and by not generating interfering traffic.

Memory Locality Improvements

A streamlined implementation can also improve target-side cache and memory locality. In the prior art using separate fetch-add and send( ), the target-side ADD and write of payload bytes are separated in time due to message latency. A set of initiators spanning near and far nodes may request fetch-add operations. The operations execute at the target in the order {A, B, C, D, . . . }. This causes memory to be allocated at the target in the order {A, B, C, D, . . . }.

However, round-trip message delay for A is generally different than for B. For example, A may be from a distant node and so has more speed-of-light delays, traverses more physical links and buffers, encounters more congestion points, and may run closer to the edge of congestion control. In other words, A's fetch-add may execute first at the target, but can have a long delay for the result to return to the initiator, and for the following message_send(dst=A, . . . ) to arrive at the target. In turn, messages may arrive at the target in some arbitrary "shuffle" of the original requests, e.g., {D, B, Z, M, . . . , A, . . . }. In high-scale systems, each target can receive hundreds of thousands of send( ) operations from distinct initiators, and re-ordering is thus frequent.

Reordering can lead to at least two problems. First, cache locality is reduced. With small messages, the message_send( ) payloads may be written to some kind of cache or write-combining structure. However, with poor locality, the benefit of these caching structures is reduced. Second, memory locality is reduced. Several common memory types (DRAM, Optane™) are organized as groups of bits often called "pages" (but entirely different than virtual memory pages), for example 512 bytes per "page". Write and read bursts within a page may be significantly faster than reads and writes that span pages.

Consider 64-byte messages and 512-byte pages: an out-of-order delay of just 512/64=8 messages leads to excess page open/close costs, hurting bandwidth. At-scale systems with tens or hundreds of thousands of distinct initiators, can suffer excess open/close costs on a majority of transfers.

The approaches described and illustrated herein can use table lookups and fixed assignments in order to avoid matching and caching. In turn, message payloads can be written into sequential memory locations, giving better cache and memory locality.

Example NIC

Figure 11:
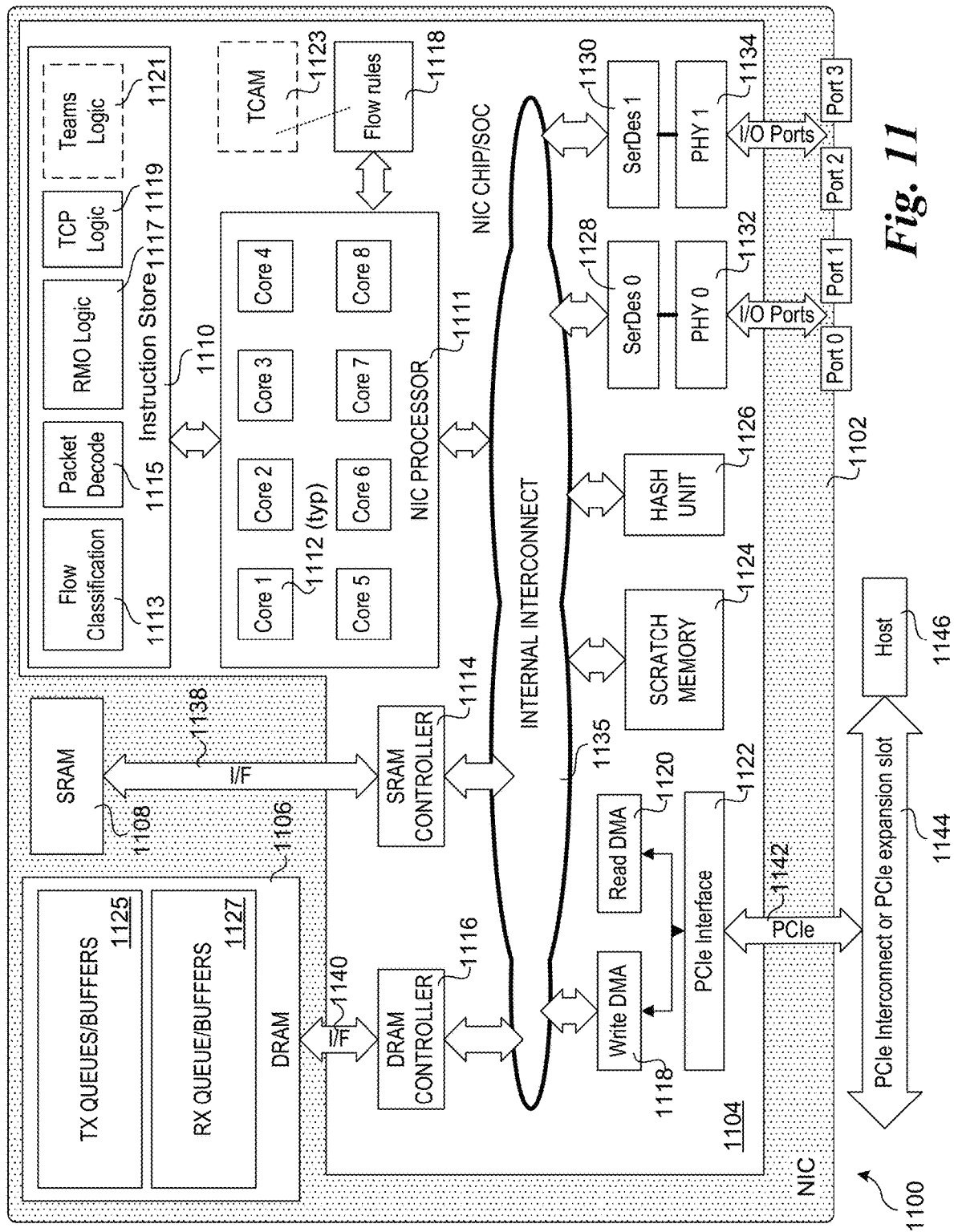
FIG. 11 is a schematic diagram of a NIC, according to one embodiment.

An exemplary system architecture for a NIC 1100 is shown in FIG. 11. NIC 1100 includes a NIC system board 1102 on which a NIC Chip/SoC 1104, Dynamic Random Access Memory (DRAM) 1106 and Static Random Access Memory (SRAM) 1108 are mounted. Under various embodiments. NIC system board 1102 is representative of an Ethernet controller card, a daughter board, a multi-chip module board or substrate, or it may be part of a computer system board, such as a main board or motherboard for a computer server. NIC Chip/SoC 1104 is representative of Ethernet processing and/or control unit, and may be embodied in various forms, including as an Ethernet controller chip or a network processor unit (NPU). In addition to Ethernet, NIC 1100 is generally representative of a network interface, network adaptor, host control adaptor, etc., the implements one or more associated network protocols.

In the illustrated embodiment, NIC Chip/SoC 1104 includes an instruction store 1110, a NIC processor 1111 including multiple cores 1112, an SRAM controller 1114, a DRAM controller 1116, a Write DMA block 1118, a Read DMA block 1120, a PCIe interface 1122, an optional TCAM (ternary content-addressable memory) 1123, a scratch memory 1124, a hash unit 1126, Serializer/Deserializers (SerDes) 1128 and 1130, and PHY interfaces 1132 and 1134. Each of the components is interconnected to one or more other components via applicable interconnect structure and logic that is collectively depicted as an internal interconnect cloud 1135.

Instruction store 1110 includes various instructions that are executed by cores 1112, including Flow Classification instructions 1113, Packet Decode instructions 1115, RMO logic instructions 1117, TCP logic instructions 1119, and optional teams logic instructions 1121. Under one embodiment, various packet processing operations are performed using a pipelined architecture. As an alternative, the combination of cores 1112 and instruction store 1110 may be implemented using embedded programmable logic, such as via a Field Programmable Gate Arrays (FPGA) or the like (not shown).

In one embodiment, instruction store 1110 is implemented as an on-chip store, such as depicted in FIG. 11. Optionally, a portion or all of the instructions depicted in instruction store 1110 may be stored in SRAM 1108 and accessed using SRAM controller 1114 via an interface 1138. SRAM 1108 may also be used for storing selected data and/or instructions relating to packet processing operations and instructions for implementing the algorithms described herein. For example, all or a portion of RMO tables and other related data structures may be stored in SRAM 1108.

Memory in DRAM 1106 is used for transmit (TX) queues/buffers 1125 and receive (RX) queues/buffers 1127 and is accessed using DRAM controller 1116 via an interface 1140. DRAM 1106 may also be used for storing other data structures relating to packet handling operations. In some embodiments, all or a portion of RMO tables and other related data structures are stored in DRAM 1106. Write DMA block 1118 and Read DMA block 1120 are respectively configured to support DMA Write and Read operations to support DMA operations between data in DRAM 1106 and SRAM 1108 and host (e.g., compute node) memory (e.g., the memories shown in the embodiments above). In the illustrated embodiment, DMA communication between DRAM 1106 and a compute node is facilitated over PCIe interface 1122 via a PCIe link 1142 coupled to a PCIe interconnect or PCIe expansion slot 1144, enabling DMA Write and Read transfers between DRAM 1106 and compute node or host memory for a host 1146 using the PCIe protocol.

In addition to PCIe, other interconnect technologies and protocols may be used. For example, these include but are not limited to Computer Express Link (CXL), InfiniBand, and Omni-Path.

Scratch memory 1124 and hash unit 1126 are illustrative of components employed by NICs for facilitating scratch memory and hashing operations relating to packet processing. For example, as described above a hash operation may be implemented for deriving flow IDs and for packet identification. In addition, a hash unit may be configured to support crypto-accelerator operations.

PHYs 1132 and 1134 facilitate Physical layer operations for the NIC, and operate as a bridge between the digital domain employed by the NIC logic and components and the analog domain employed for transmitting data via electrical, optical or wired signals. For example, in the illustrated embodiment of FIG. 11, each of PHYs 1132 and 1134 is coupled to a pair of I/O ports configured to send electrical signals over a wire or optical cable such as a high-speed Ethernet cable. Optical and wireless signal embodiments would employ additional circuitry and interfaces for facilitating connection via optical and wireless signals (not shown). In conjunction with PHY operations, SerDes 1128 and 1130 are used to serialize output packet streams and deserialize inbound packet streams.

Generally, a NIC may be configured to store routing data for facilitating packet identification and flow classification, including forwarding filters and rules either locally or using a memory-mapped IO (MMIO) address space in system or host memory. When stored locally, this routing data may be stored in either DRAM 1106 or SRAM 1108. Routing data stored in a MMIO address space may be accessed by NIC 1100 via Read and Write DMA operations. Generally, setting up MMIO address space mapping may be facilitated by a NIC device driver in coordination with the operating system. The NIC device driver may also be configured to enable instructions in instruction store 1110 to be updated via the operating system. Optionally, the instructions in instruction store may comprise firmware instructions that are stored in non-volatile memory, such as Flash memory, which may either be integrated on NIC Chip/SoC 1104 or mounted to NIC system board 1102 (not shown).

As an option to using DRAM 1106 or SRAM 1108, flow rules 1118 may be implemented in hardware-based logic such as a FPGA or other programmable logic device coupled to NIC processor 1111. Hash unit 1126 may be implemented in the same hardware-based logic as that used for flow rules 1118. Flow rules 1118 may also be implemented using TCAM 1123.

NIC processor 1111 may employ any suitable processor architecture in current use or developed in the future. In one embodiment, the processor architecture is an Intel® x86 architecture, an IA-32 architecture or an IA-64 architecture. In one embodiment, the NIC processor architecture is an ARM®-based architecture.

Example IPU/SmartNIC

Figure 12:
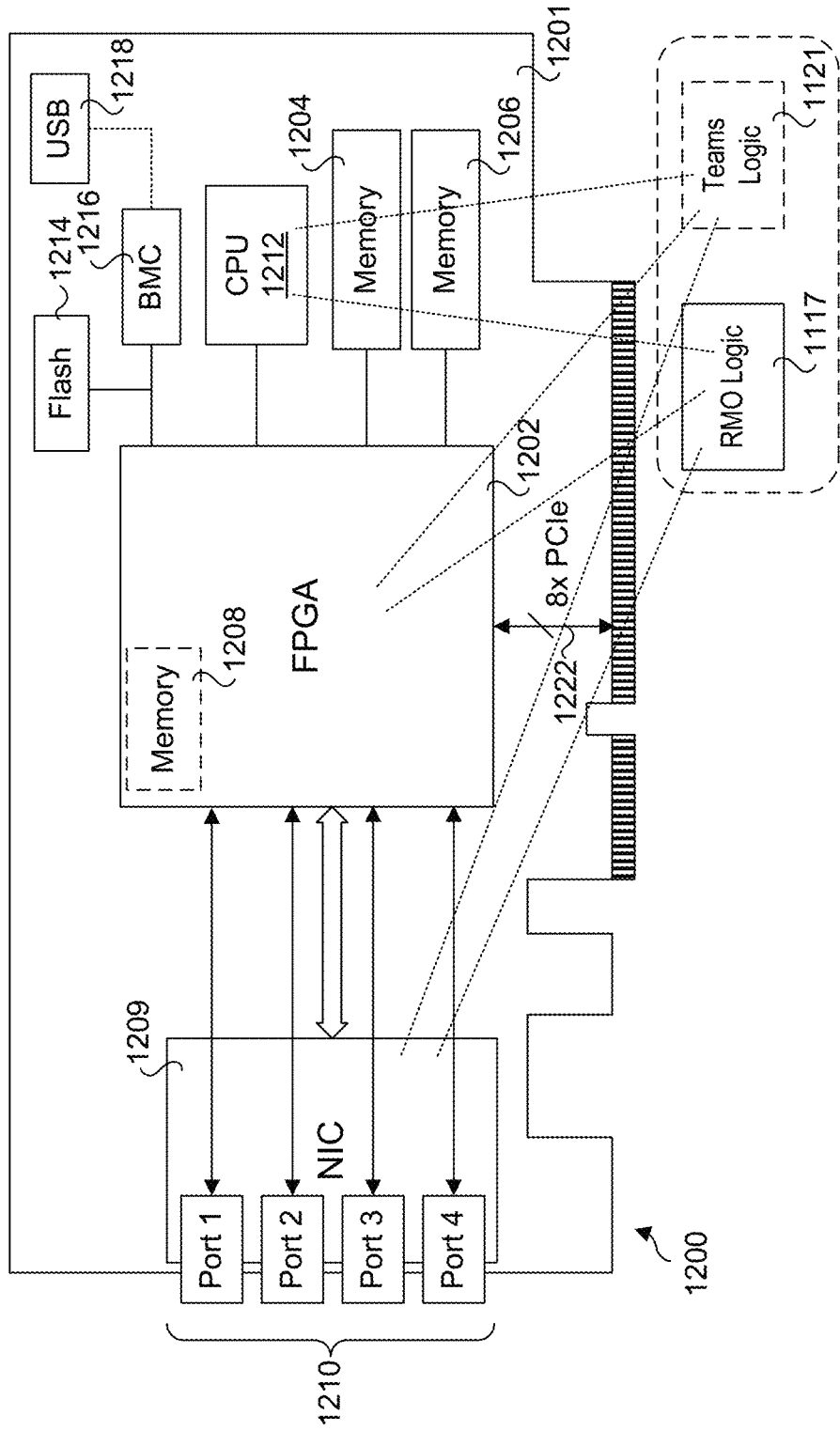
FIG. 12 is a schematic diagram illustrating an infrastructure Processing Unit (IPU) or SmartNIC, according to one embodiment.

Aspects of the embodiments disclosed herein may be implemented in an Infrastructure Processor Unit, which may also be called a SmartNIC. FIG. 12 shows an example IPU 1200, according to one embodiment. IPU 1200 includes multiple components that are coupled to a circuit board 1201. The components include an FPGA 1202 that may be programmed to implement various logic described herein. Generally, an FPGA may access data stored in one or more memory devices, such as depicted by memory devices 1204 and 1206. As described below, various types of memory devices may be used, including but not limited to DDR4 and DDR5 DIMMS (Dual Inline Memory Modules). The FPGA may also include onboard memory 1208 in which data may be stored.

In the illustrated embodiment, IPU 1200 includes a NIC chip 1209 with four network ports 1210, respectively labeled Port 1, Port 2, Port 3, and Port 4. Data can be transferred between NIC chip 1209 and FPGA 1202 using separate links per network port 1210 or using a multiplexed interconnect. In one embodiment, NIC chip 1209 employs a 40 GB/s MAC, and each of the four network ports 1210 is a 10 GB/s port. In other embodiments, NIC chip 1209 may employ a MAC with other bandwidths. Also, the illustrated use of four ports is merely exemplary and non-limiting, as a IPU may have various numbers of network ports. In some embodiments, an IPU may include multiple NIC chips.

IPU 1200 further includes a CPU 1212 flash memory 1214, a baseboard management controller (BMC) 1216, and a USB module 1218. CPU 1212 may be used to execute embedded software/firmware or the like. Flash memory 1214 may be used to store firmware and/or other instructions and data in a non-volatile manner. Other software may be loaded over a network coupled to one or more of the NIC ports.

In the illustrated embodiment, FPGA 1202 has a PCIe interface that is connected to a PCIe edge connector configured to be installed in a PCIe expansion slot. In one embodiment, the PCIe interface comprises an 8 lane (8×) PCIe interface 1222. Other PCIe interface lane widths may be used in other embodiments, including 16 lane (16×) PCIe interfaces.

In some embodiments, a portion of the FPGA circuitry is programmed to implement RMO logic 1117 and/or Teams Logic 1121. Optionally, similar logic may be implemented via execution of associated software/firmware on CPU 1212 or in NIC chip 1209. Other logic and operations described in the foregoing embodiments may be implemented using one or more of FPGA 1202, CPU 1212, and NIC chip 1209. FPGA circuitry on FPGA 1202 and/or execution of embedded software/firmware on CPU 1212 may also be used to implement/execute operators.

The memories illustrated in the Figures herein are logical representations of memory implemented via one or more physical memory devices. Such memory devices may include volatile memory, non-volatile memory, and hybrid memory devices.

Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5), LPDDR5, HBM2E, HBM3, and HBM-PIM, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell (PLC) or some other NAND). A NVM device can also include a byte-addressable write-in-place three dimensional crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic or a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
sending a first message comprising a receiver-managed offset (RMO) PUT or UPDATE from an initiator to a target having a plurality of processing elements (PEs) and one or more memories operatively coupled to a Network Interface controller (NIC), the message including an RMO key, data, and a length;
upon receipt of the first message at the NIC on the target, extracting the RMO key and employing the RMO key to identify an address or address offset of a memory buffer in a memory; and
one of,
　writing, via the NIC, the data at the address or address offset in the memory buffer when the first message is an RMO PUT; otherwise
　applying an update operation, via the NIC, to existing data at the address or address offset in the memory buffer using the data in an RMO UPDATE.

2. The method of claim 1, further comprising:
implementing a list or table on the target comprising a plurality of indicators indexed by an index value;
one of,
　i. computing an index value using the RMO key as an input to the key function; or
　ii. employing the RMO key as an index value;
identifying an indicator in the list or table using the index value; and
employing the indicator to determine the address or address offset in the memory buffer.

3. The method of claim 2, wherein the RMO key comprises a PE number comprising a first integer and an RMO number comprising a second integer, and where the key function comprises a bitwise concatenation of the PE number and the RMO number or a bitwise concatenation of the RMO number and PE number.

4. The method of claim 2, wherein the indicator comprises one of a counter or a pointer to a counter, further comprising:
using a current counter value to determine an address offset in the memory buffer at which to write the data; and
one of,
　i. updating the current counter value as a function of the length prior to writing the data; or
　ii. updating the current counter value as a function of the length after writing the data.

5. The method of claim 1, further comprising:
implementing an associative key-counter table on the target;
employing the RMO key as an input to identify a counter; and
employing the counter to determine an offset address at which to write the data.

6. The method of claim 1, wherein the first message further includes a PE tag comprising one of a node identifier and a PE identifier or a PE identifier.

7. The method of claim 1, further comprising:
sending a second message comprising an RMO GET message from the initiator to the target, the RMO GET message including an RMO key, a destination buffer, and a length;
processing, via the NIC on the target, the RMO GET message to extract the RMO key and employ the RMO key to identify an address or address offset of a memory buffer in a memory;
read, via the NIC, data having the length beginning at the address or address offset in the memory buffer;
returning a third message from the target to the initiator including a data payload comprising the data that are read and the destination buffer; and
writing, at the initiator, the data payload into the destination buffer.

8. The method of claim 1, wherein the initiator has a plurality of processing elements (PEs) and one or more memories operatively coupled to a NIC, further comprising:
sending a second message comprising an RMO GET message from the initiator to the target, the RMO GET message including an RMO key, a source buffer, and a length;
processing, via the NIC on the target, the RMO GET message to read data having the length from the source buffer;
returning a third message from the target to the initiator including the RMO key, a data payload comprising the data that are read, and the length;
upon receipt of the third message at the NIC on the initiator, extracting the RMO key and employing the RMO key to identify an address or address offset of a memory buffer in a memory; and
writing, via the NIC on the initiator, the data payload at the address or address offset in the memory buffer.

9. An apparatus, configured to be implemented in a compute node including a plurality of processing elements (PEs) and one or more memories operatively coupled to the apparatus when installed in the compute node, comprising:
one or more network ports; and
circuitry and logic to:
　receive, from an initiator at a network port, a first message comprising a receiver-managed offset (RMO) PUT or UPDATE and including an RMO key, data, and a length;
　extract the RMO key from the first message and employ the RMO key to identify an address or address offset of a memory buffer in a memory; and
　one of,
　　write the data to the memory buffer beginning at the address or address offset in the memory buffer when the first message is an RMO PUT; otherwise
　　apply an update operation, via the NIC, to existing data at the address or address offset in the memory buffer using the data in an RMO UPDATE.

10. The apparatus of claim 9, further comprising circuitry and logic to:
implement a list or table comprising a plurality of indicators indexed by an index value;
one of,
　i. compute an index value using the RMO key as an input to a key function; or
　ii. employ the RMO key as an index value;
identify an indicator in the list or table using the index value; and
employ the indicator to determine the address or address offset in the memory buffer.

11. The apparatus of claim 10, wherein the RMO key comprises a PE number comprising a first integer and an RMO number comprising a second integer, and where the key function comprises a bitwise concatenation of the PE number and the RMO number or a bitwise concatenation of the RMO number and PE number.

12. The apparatus of claim 9, wherein the indicator comprises one of a counter or a pointer to a counter, further comprising circuitry and logic to:
use a current counter value to determine an address offset in the memory buffer at which to write the data; and one of,
   i. update the current counter value as a function of the length prior to writing the data; or
   ii. update the current counter value as a function of the length after writing the data.

13. The apparatus of claim 9, further comprising circuitry and logic to:
implement an associative key-counter table on the target;
employ the RMO key as an input to the key-counter table to identify a counter; and
employ the counter to determine an offset address at which to write the data.

14. The apparatus of claim 9, wherein the first message further includes a PE tag comprising one of a node identifier and a PE identifier or a PE identifier.

15. The apparatus of claim 9, further comprising circuitry and logic to:
send a second message comprising an RMO GET message from the initiator to the target, the RMO GET message including an RMO key, a destination buffer, and a length;
processing, via the NIC on the target, the RMO GET message to extract the RMO key and employ the RMO key to identify an address or address offset of a memory buffer in a memory;
read, via the NIC, data having the length beginning at the address or address offset in the memory buffer;
returning a third message from the target to the initiator including a data payload comprising the data that are read and the destination buffer; and
writing, at the initiator, the data payload into the destination buffer.

16. The apparatus of claim 9, wherein the initiator has a plurality of processing elements (PEs) and one or more memories operatively coupled to a NIC, further comprising:
send a second message comprising an RMO GET message destined for a target from a network port, the RMO GET message including an RMO key, a source buffer on the target, and a length;
receive, at a network port, a third message from the target including the RMO key, a data payload comprising data that are read from the source buffer, and the length;
extract the RMO key and employ the RMO key to identify an address or address offset of a memory buffer in a memory; and
write the data payload at the address or address offset in the memory buffer.

17. A compute node, configured to be implemented in a distributed environment comprising a plurality of compute nodes, comprising:
a plurality of processing elements (PEs);
one or more memory devices; and
a Network Interface Controller (NIC), including,
one or more network ports; and
circuitry and logic to:
receive, at a network port and originating from a second compute node comprising an initiator, a first message comprising a receiver-managed offset (RMO) PUT or UPDATE and including an RMO key, data, and a length;
extract the RMO key from the first message and employ the RMO key to identify an address or address offset of a memory buffer in a memory device; and
one of,
write the data to the memory buffer beginning at the address or address offset in the memory buffer when the first message is an RMO PUT; otherwise
apply an update operation to existing data at the address or address offset in the memory buffer using the data in an RMO UPDATE.

18. The compute node of claim 17, wherein the NIC further comprises circuitry and logic to:
implement a list or table comprising a plurality of indicators indexed by an index value;
one of,
   i. compute an index value using the RMO key as an input to a key function; or
   ii. employ the RMO key as an index value;
look up an indicator in the list or table using the index value; and
employ the indicator to determine the address or address offset in the memory buffer.

19. The compute node of claim 17, wherein the RMO key comprises a PE number comprising a first integer and an RMO number comprising a second integer, and where the key function comprises a bitwise concatenation of the PE number and the RMO number or a bitwise concatenation of the RMO number and PE number.

20. The compute node of claim 17, wherein the compute node is further configured to:
send a second message comprising an RMO GET message destined for a target compute node from a network port, the RMO GET message including an RMO key, a source buffer on the target compute node, and a length;
receive, at a network port, a third message from the target compute node including the RMO key, a data payload comprising data that are read from the source buffer, and the length;
extract the RMO key from the third message and employ the RMO key to identify an address or address offset of a memory buffer in a memory device; and
write the data payload at the address or address offset in the memory buffer.

* * * * *